(12) United States Patent
Chen (10) Patent No.: US 8,104,728 B2
(45) Date of Patent: Jan. 31, 2012

(54) ADJUSTABLE DISPLAY SCREEN DESK SUPPORT

(75) Inventor: Wen-Chun Chen, Tao Yuan (TW)

(73) Assignee: Hoolin Research Company Limited, Tao Yuan (TW)

( * ) Notice: Subject to any disclaimer, the term of this patent is extended or adjusted under 35 U.S.C. 154(b) by 0 days.

(21) Appl. No.: 12/003,961

(22) Filed: Jan. 3, 2008

(65) Prior Publication Data

US 2011/0108698 A1 May 12, 2011

(51) Int. Cl.
*E04G 3/00* (2006.01)
(52) U.S. Cl. ............. 248/286.1; 248/295.11; 248/296.1; 248/919
(58) Field of Classification Search .................. 248/917, 248/919, 920, 918, 274.1, 295.11, 282.1, 248/285.1, 289.31, 280.11, 125.1, 292.13, 248/288.51, 296.1, 286.1; 361/679.01, 679.02, 361/679.21, 679.22; 285/325, 326
See application file for complete search history.

(56) References Cited

U.S. PATENT DOCUMENTS

| | | | | |
|---|---|---|---|---|
| 6,935,883 | B2 * | 8/2005 | Oddsen, Jr. | 439/374 |
| 7,922,137 | B2 * | 4/2011 | Derry et al. | 248/274.1 |
| 2004/0011932 | A1 * | 1/2004 | Duff | 248/157 |
| 2005/0041379 | A1 * | 2/2005 | Jang | 361/681 |
| 2006/0266909 | A1 * | 11/2006 | Oddsen et al. | 248/371 |
| 2007/0045488 | A1 * | 3/2007 | Shin | 248/176.1 |
| 2007/0097618 | A1 * | 5/2007 | Searby et al. | 361/686 |
| 2007/0217134 | A1 * | 9/2007 | Shin | 361/681 |

* cited by examiner

*Primary Examiner* — Terrell McKinnon
*Assistant Examiner* — Eret McNichols
(74) *Attorney, Agent, or Firm* — Guice Patents PLLC (57) ABSTRACT

An adjustable display screen support includes a support arm with a mounting assembly at the bottom end for fastening to the top of a desk and a coupling block at the top end for holding a coupling block that has a base frame, an attachment frame hooked on the base frame, and a lock for locking the attachment frame to the base frame, a rail that has a flat base panel, a cover shell, a slide affixed to the attachment frame and movable along longitudinal sliding slots of the flat base panel, and spiral springs mounted in the slide each having one end affixed to the cover shell, and a display screen mount affixed to the cover shell to support a display screen.

17 Claims, 12 Drawing Sheets

ADJUSTABLE DISPLAY SCREEN DESK SUPPORT

BACKGROUND OF THE INVENTION

1. Field of the Invention

The present invention relates to a display screen support structure and more particularly, to an adjustable display screen desk support that is easy to install, and allows stable adjustment of the elevation of the supported display screen.

2. Description of the Related Art

Conventional LCD monitor desk supports that allow adjustment of the elevation of the LCD monitor include two types, namely, the elbow joint design and the retractable support arm design. A LCD monitor desk support of elbow joint design uses an elbow joint to connect two arm members that are turnable relative to each other to adjust the elevation of the LCD monitor. However, when adjusting the elevation of the LCD monitor, the distance between the LCD monitor and the user is relatively changed. Therefore, this design of LCD monitor desk support is still not satisfactory in function. A LCD monitor desk support of retractable support arm design comprises a hollow outer support arm, and an inner support arm axially movable in and out of the hollow outer support arm and lockable to the hollow outer support arm at the desired elevation with a lock. This design of LCD monitor desk support allows easy adjustment of the elevation of the LCD monitor without causing significant change of the distance between the user and the LCD monitor. However, this design of LCD monitor desk support requires much vertical space. Further, during elevational adjustment of the LCD monitor, the retractable support arm structure does not provide structural stability.

SUMMARY OF THE INVENTION

The present invention has been accomplished under the circumstances in view. According to one aspect of the present invention, the adjustable display screen support comprises a support arm, a mounting assembly provided at the bottom end of the support arm for securing the support arm to the top of a desk, a coupling block fastened to a connector at the top end of the support arm, a rail mounted on the coupling block, and a display screen mount mounted on the rail to support a display screen. The rail comprises a flat base panel that has at least one longitudinal sliding slot, a cover shell fixedly mounted with the display screen mount and fixedly covered on the flat base panel, a slide mounted inside the cover shell and affixed to the coupling block and movable relative to the display screen mount and the display screen being supported on the display screen mount, the sliding having at least one sliding flange inserted through and movable along the at least one longitudinal sliding slot and affixed to the coupling block and at least one accommodation chamber, and at least one spiral spring respectively mounted in the at least one accommodation chamber each having one end affixed to the slide and an opposite end affixed to one end of the cover shell. Therefore, the display screen can be moved with the display screen mount and the cover shell of the rail relative to the slide and the coupling block to the desired elevation and positioned in the adjusted elevational position by means of the spring force of the at least one spiral spring.

According to another aspect of the present invention, the coupling block comprises a base frame, that has an axle hole and a bottom hook hole, an attachment frame affixed to the cover shell of the rail and attachable to the base frame and having a bottom hook for hooking in a bottom hook hole of the base frame and a latch hole near the bottom hook, and a lock mounted in the axle hole of the base frame and operable to move a latch thereof in and out of the latch hole for locking the attachment frame to the base frame or unlocking the attachment frame from the base frame.

DETAILED DESCRIPTION OF THE PREFERRED EMBODIMENT

Referring to FIGS. 1~3 and 10, an adjustable display screen desk support in accordance with the present invention is shown comprised of a mounting assembly 1, a support arm 2, a coupling block 3, a rail 4, and a display screen mount 5.

Figure 1:
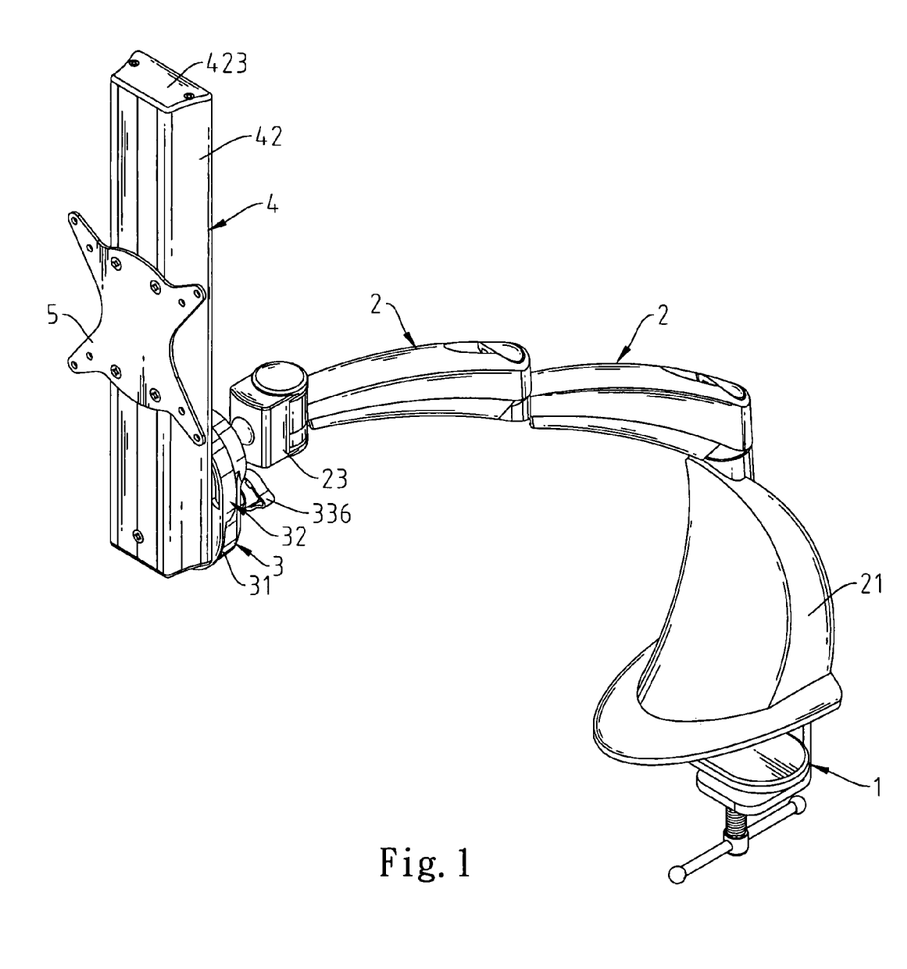
FIG. 1 is an elevational view of a display screen desk support in accordance with the present invention.
Figure 2:
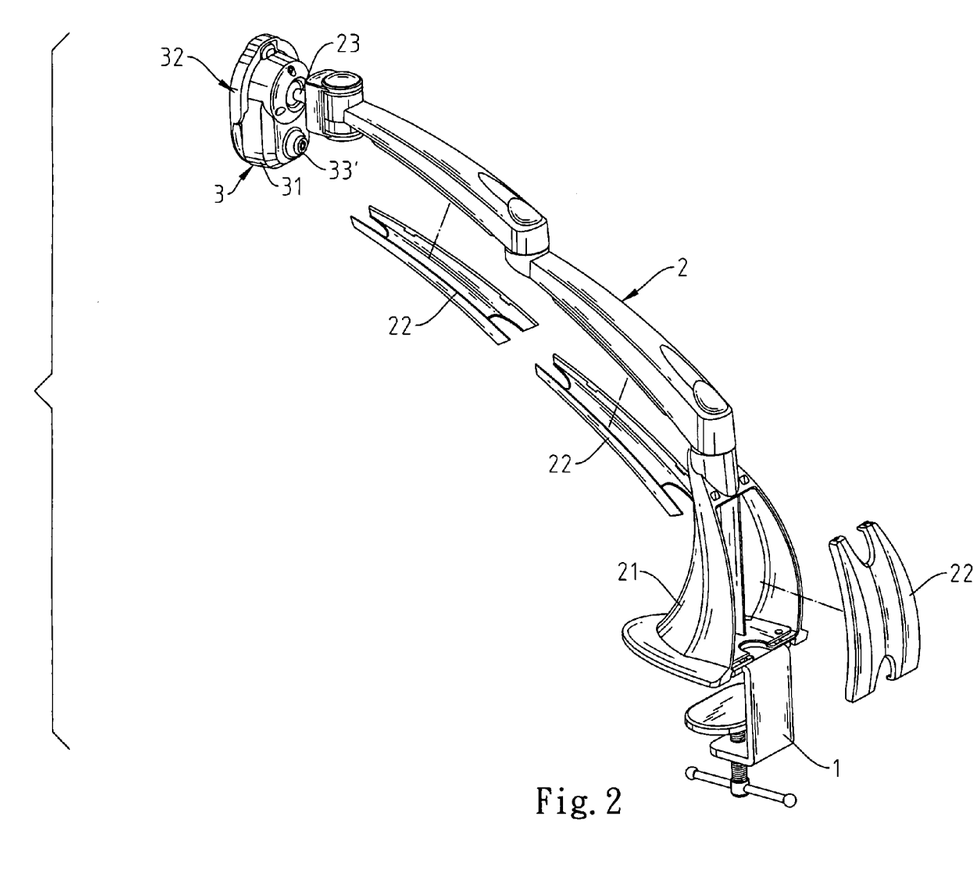
FIG. 2 is an exploded view of the display screen desk support in accordance with the present invention.
Figure 3:
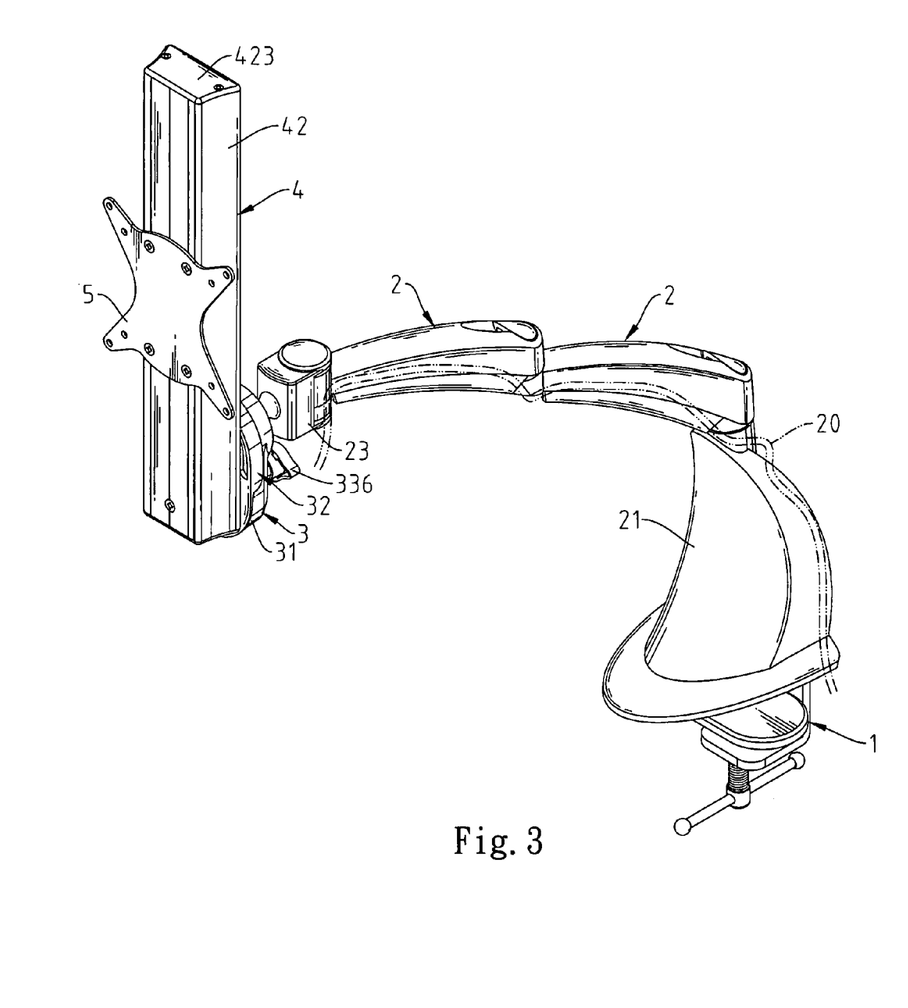
FIG. 3 is a schematic drawing showing hidden arrangement of the electric cable in the display screen desk support in accordance with the present invention.
Figure 4:
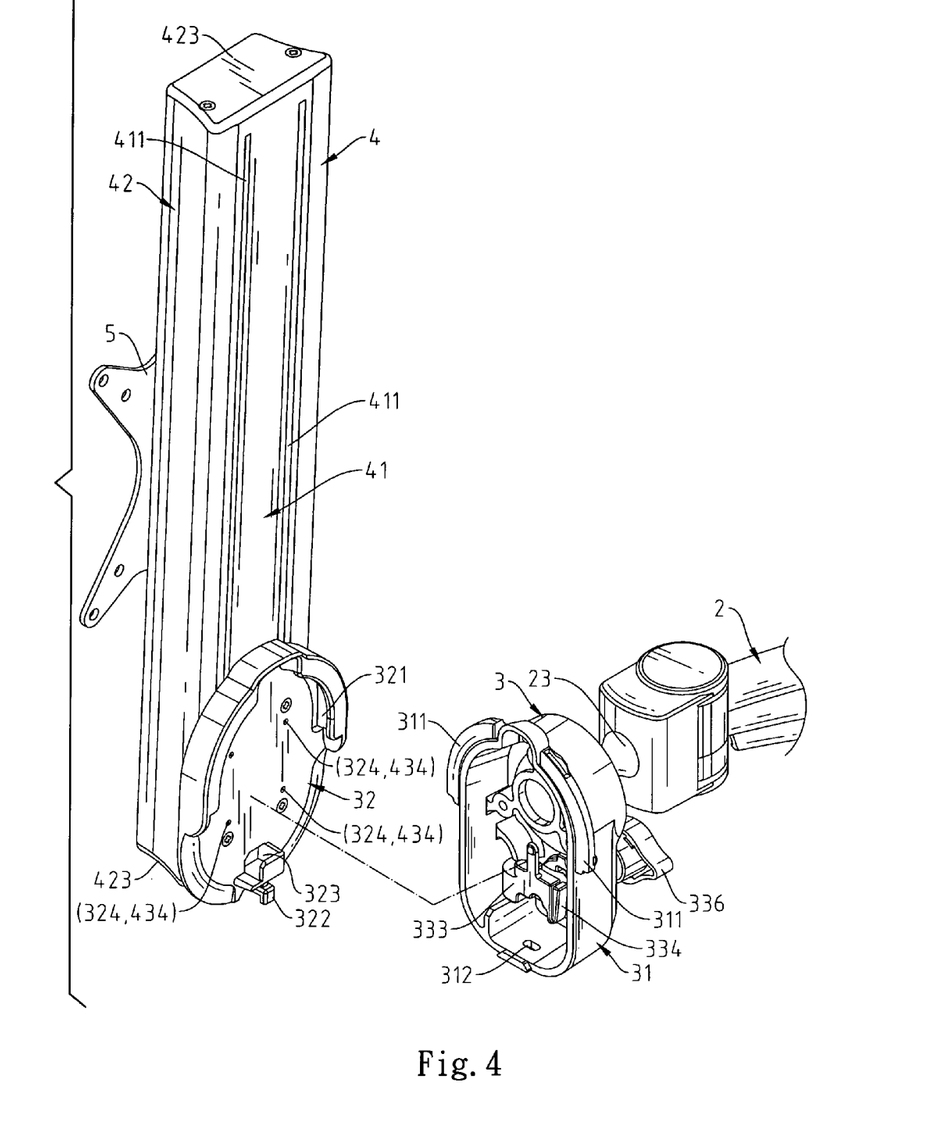
FIG. 4 is an exploded view of a part of the present invention, showing the structure of the coupling block of the display screen desk support.
Figure 5:
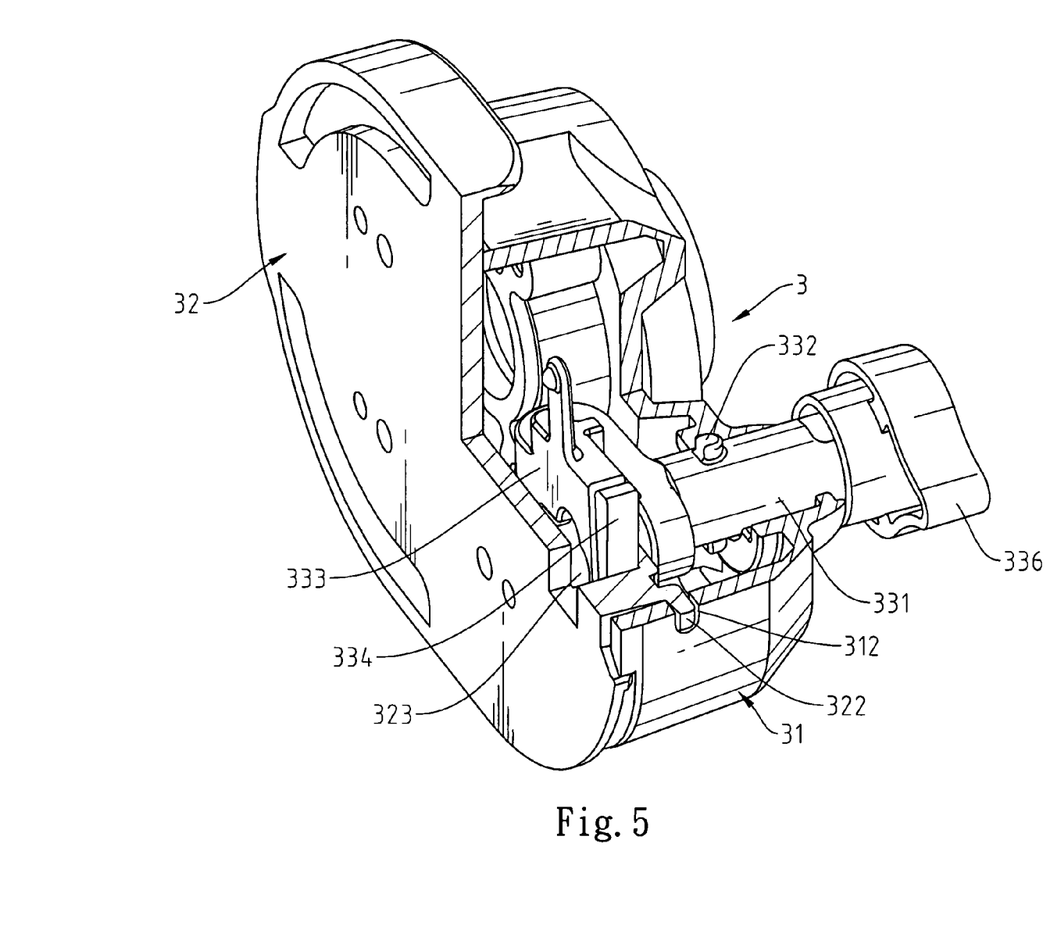
FIG. 5 is a cutaway of a part of the present invention, showing the structure of the positioning of the lock in the coupling block of the display screen mount of the display screen desk support.
Figure 6:
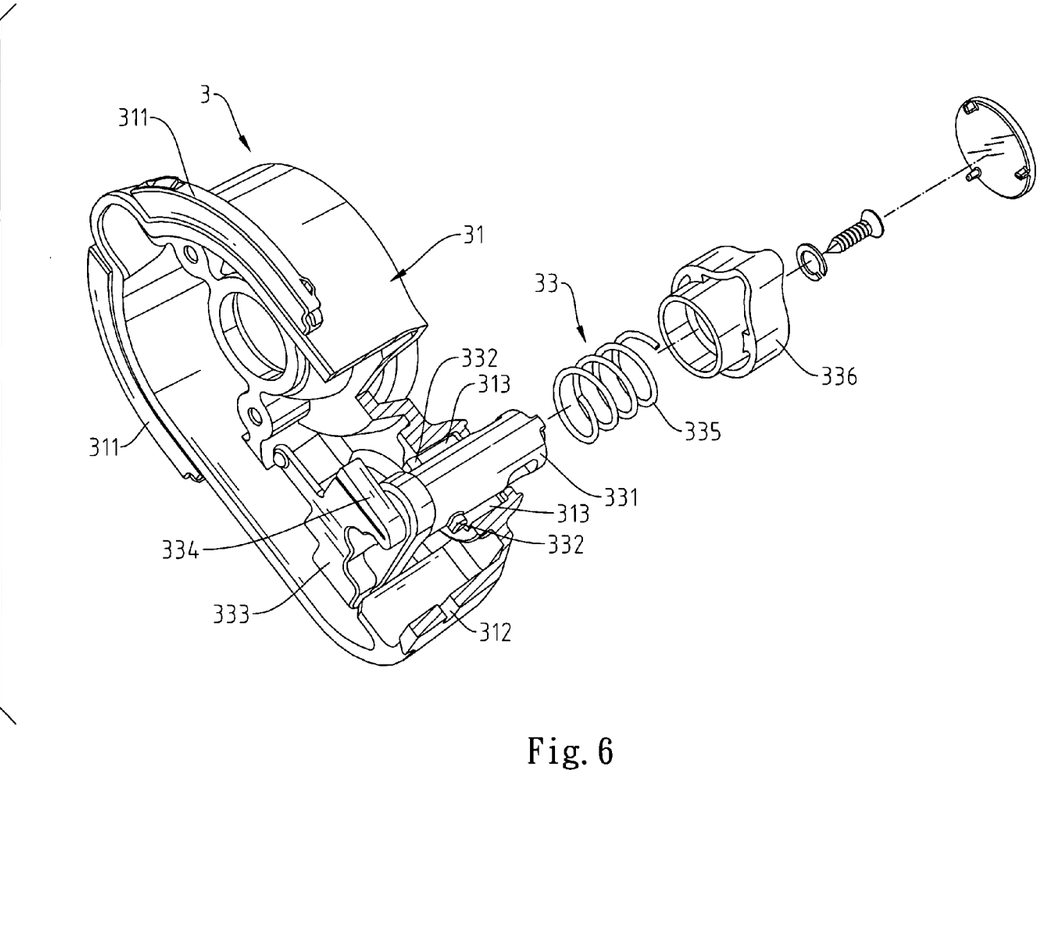
FIG. 6 is an exploded view of a part of the present invention, showing the structure of the lock of the display screen desk support.

The mounting assembly 1 is a known mechanism (for example, comprised of a mounting shaft, a mounting-shaft sleeve and a tension clamp) adapted for fastening to the top of a desk (not shown) to support the support arm 2. The support arm 2 has multiple hollow arm sections 21 that are pivotally connected to one another for allowing adjustment of the angle of one section relative to another. The electric cable 10 of the supported display screen 10 extends along the length of the hollow arm sections 21 of the support arm 2, and kept from sight by cover shells 22. The support arm 2 has a connector 23 at its front end (the end remote from the mounting assembly). The coupling block 3 is fastened to the connector 23 to hold the rail 4. The display screen mount 5 is mounted on the rail 4 to support the display screen 10.

Referring to FIGS. 4~6 and 9, the coupling block 3 comprises a base frame 31, an attachment frame 32, and a lock 33. The base frame 31 is fastened to the connector 23 of the support arm 2. The base frame 31 comprises a coupling flange 311 extending around the upper part of the periphery, and a bottom hook hole 312 at the bottom side, an axle hole 313 on the inside for accommodating the lock 33. The lock 33 comprises a bolt 331 inserted through the axle hole 313 of the base frame 31, a latch 333 disposed inside the base frame 31 and connected to one end of the bolt 331, two spring-supported pins 332 that are provided at the bolt 331 at two opposite sides near the latch 333 and movable subject to the operation of the knob 336 between a first position where the spring-supported pins 332 are received inside the axle hole 313 and a second position where the spring-supported pins 332 are stopped outside the axle hole 313, a knob 336 affixed to one end of the bolt 331 opposite to the latch 333, and a spring member 335 sleeved onto the bolt 335 and stopped between the outside wall of the axle hole 313 and the knob 336. Rotating the knob 336 causes rotation of the latch 333 with the bolt 331.

The aforesaid attachment frame 32 is affixed to the rail 4. The attachment frame 32 has a coupling groove 321 fitting the coupling flange 311 of the base frame 31, a bottom hook 322 hooking in the bottom hook hole 312 of the base frame 31, a plurality of plugholes 324, and a side latch hole 323 disposed near the bottom hook 322 for receiving the latch 333 of the lock 33. By means of engagement between the coupling groove 321 of the attachment frame 32 and the coupling flange 311 of the base frame 31 at the top side and engagement between the bottom hook hole 312 of the base frame 31 and the bottom hook 322 of the attachment frame 32 at the bottom side, the connection stability between the base frame 31 and the attachment frame 32 is assured. After connection between the base frame 31 and the attachment frame 32, press the knob 336 and then rotate the knob 336 to force the latch 333 into the side latch hole 323, thereby locking the base frame 31 and the attachment frame 32.

Figure 7:
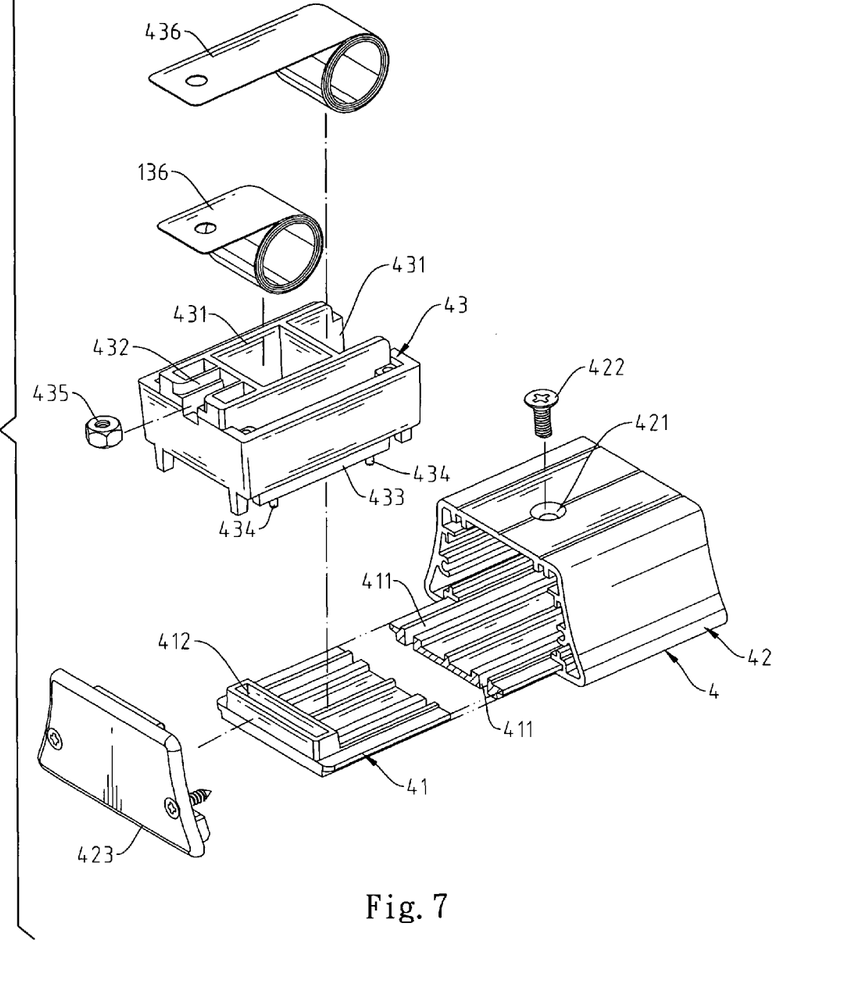
FIG. 7 is an exploded view of a part of the present invention, showing the structure of the rail of the display screen desk support.
Figure 8:
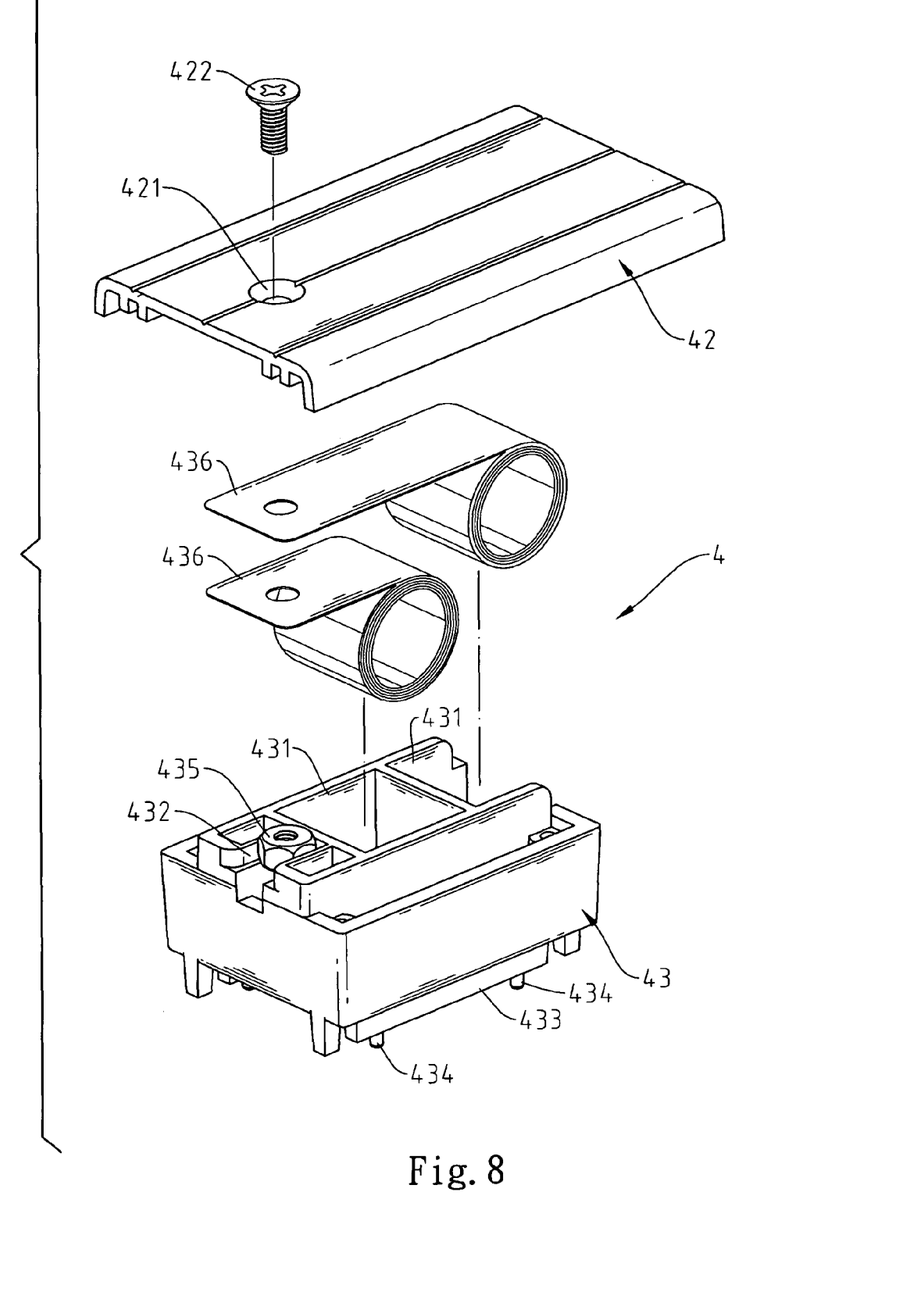
FIG. 8 is an exploded view of a part of the rail of the display screen desk support in accordance with the present invention.
Figure 9:
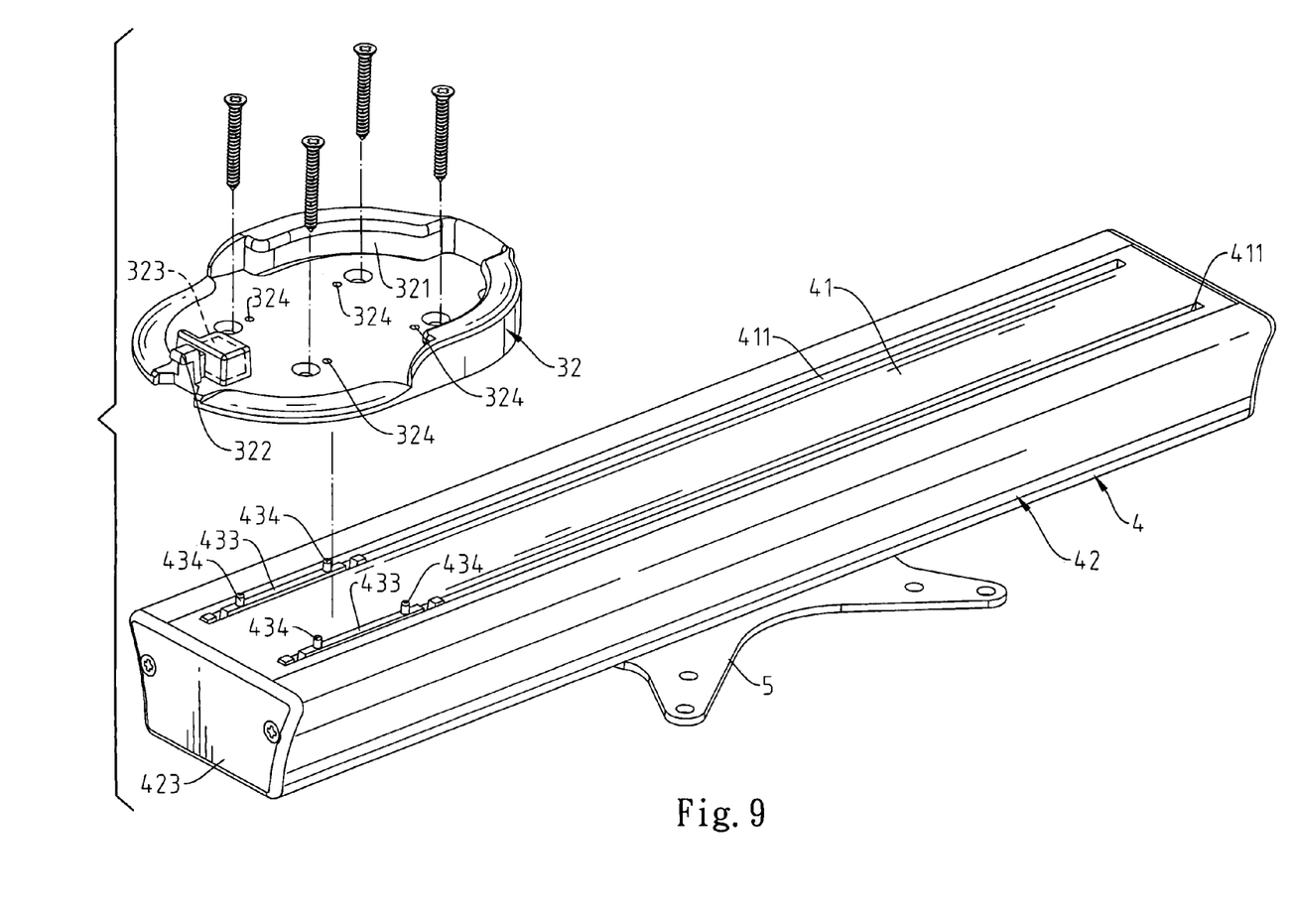
FIG. 9 is an exploded view of a part of the present invention, showing the mounting arrangement between the attachment frame and the rail of the display screen desk support.

Referring to FIGS. 7~9, the rail 4 is a hollow elongated member comprising a flat base panel 41, a cover shell 42, and a slide 43. The cover shell 42 is shaped like an elongated box having two detachable end plates 423. The end plates 423 are respectively affixed to the two distal ends of the cover shell 42 after insertion of the flat base panel 41 into the cover shell 42 to close the open side of the cover shell 42. The flat base panel 41 has two longitudinal sliding slots 411 arranged in parallel, and a transverse bumper 412 at each of the two distal ends. The slide 43 has two bottom sliding flanges 433 respectively coupled to the longitudinal sliding slots 411 so that the slide 43 is movable along the longitudinal sliding slots 411 within the cover shell 42 between the two transverse bumpers 412, The slide 43 has at least one, for example, two accommodation chambers 43 that accommodate a respective spiral spring 436. Each spiral spring 436 has one end extended out of the respective accommodation chamber 43 and affixed to one end of the cover shell 42 by a screw 422 that is mounted in a mounting through hole 421 on one end of the cover shell 42 adjacent to one end plate 423 and a nut 435 that is receivable in a locating groove 432 at one end of the slide 43. The slide 43 further has a plurality of bottom rods 434 protruded from the sliding flanges 433 and respectively fitted into the plugholes 324 of the attachment frame 32. After fitting of the bottom rods 434 into the plugholes 324, the attachment frame 32 is affixed to the slide 43 with screws.

Figure 10:
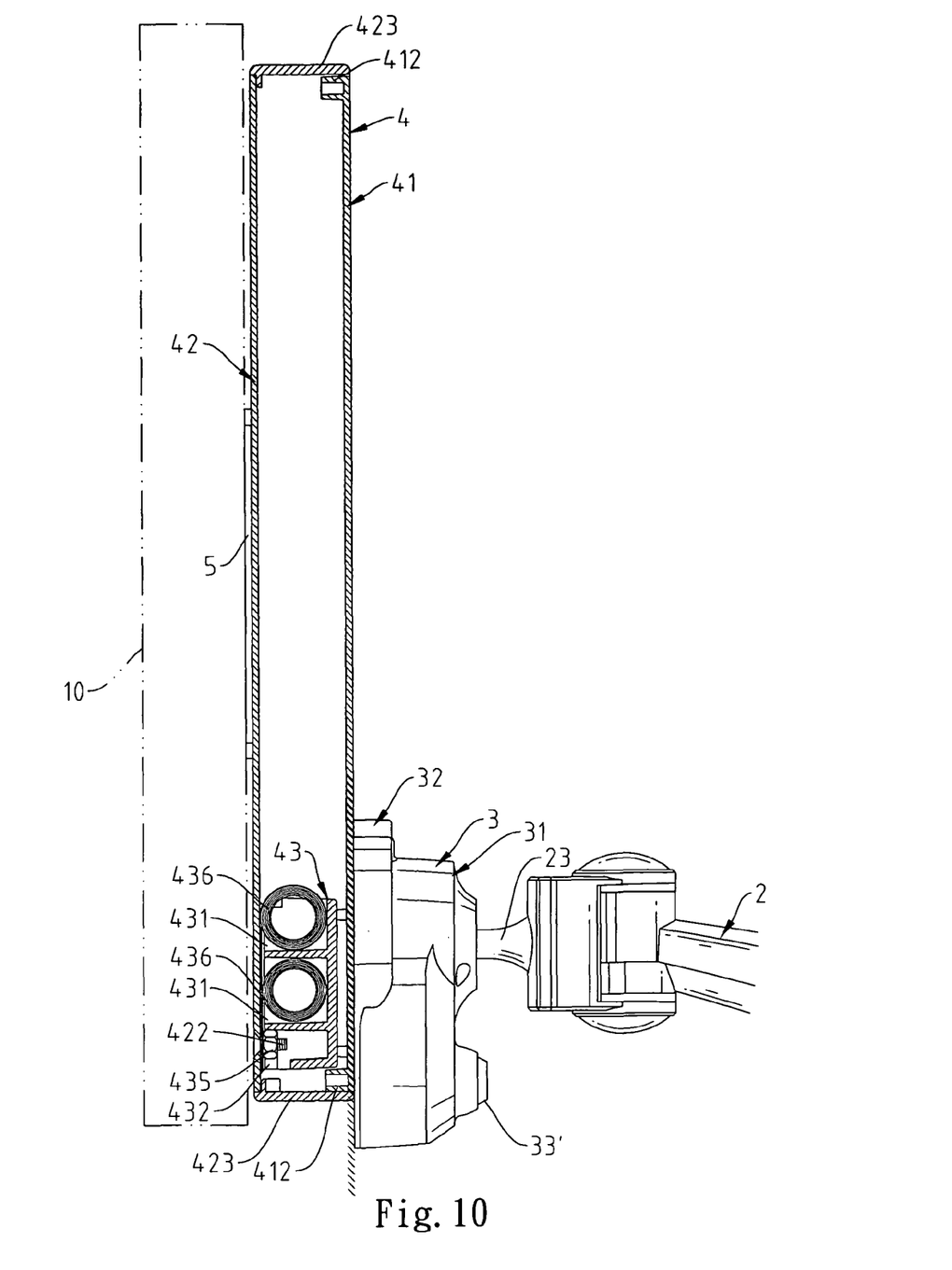
FIG. 10 is a schematic drawing of the present invention, showing the display screen adjusted upwards.
Figure 11:
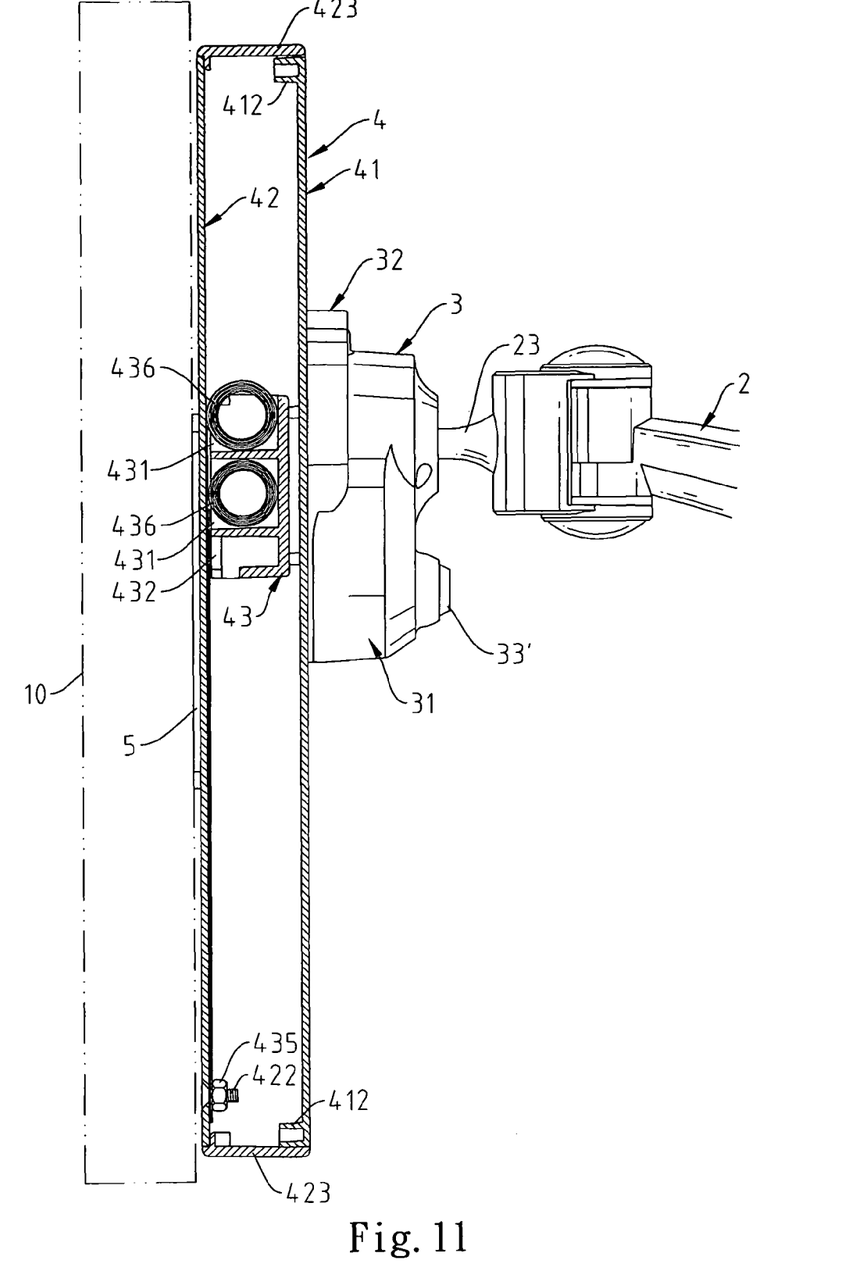
FIG. 11 is a schematic drawing of the present invention, showing the display screen adjusted upwards.

Referring to FIGS. 4, 7, 10 and 11, the display screen mount 5 is affixed to the cover shell 42 of the rail 4 to support the display screen 10 outside the rail 4. Therefore, the display screen 10 can be moved with the base panel 41 and the cover shell 42 relative to the slide 43. When moving the display screen 10 vertically upwards/downwards relative to the slide 43 and the coupling block 3, the spiral springs 436 are extended out or received. When the display screen 10 is lowered to a predetermined elevation relative to the slide 43 and the coupling block 3, the spiral springs 436 are extended out, and the extended part of the spiral springs 436 is closely attached to the inside wall of the cover shell 42, thereby supporting the rail 4 in position (see FIG. 11). When the display screen 10 is lifted with the base panel 41 and the cover shell 42 relative to the slide 43 and the coupling block 3 to the upper limit position, as shown in FIG. 10, the slide 43 is stopped at the bottom transverse bumper 412 of the base panel 41 and the spiral springs 436 are in a received status, and at this time, the screw 422 and the nut 435 are received in the downwardly extending locating groove 432 without interference.

Figure 12:
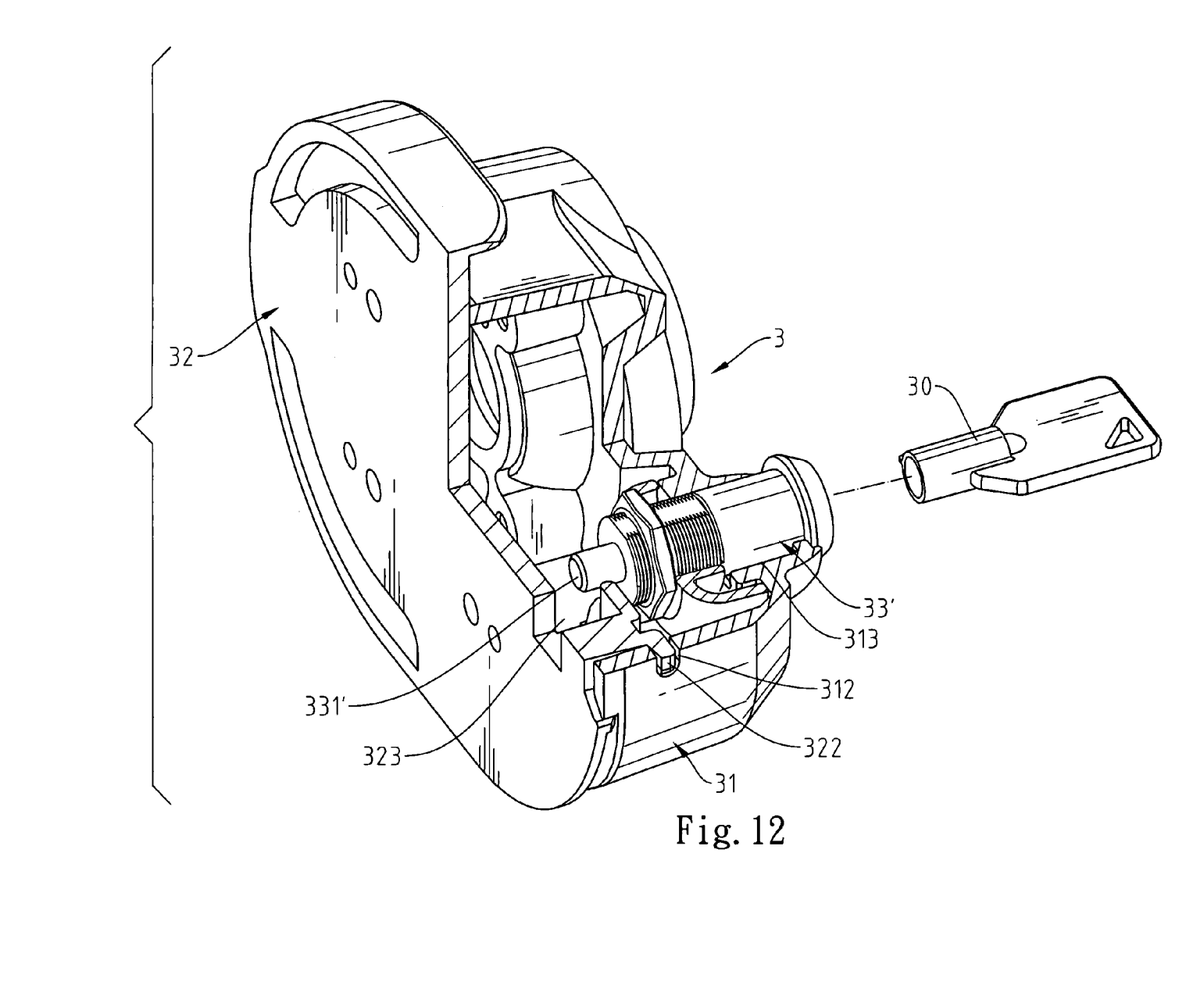
FIG. 12 is a schematic drawing showing an alternate form of the lock in the coupling block according to the present invention.

FIG. 12 is a schematic drawing showing an alternate form of the lock in the coupling block according to the present invention. According to this embodiment, the lock 33' is a lock cylinder mounted in the axle hole 313 of the base frame 1 of the coupling block 3 and having a latch 331' movable with a key 30 in and out of the side latch hole 323 of the attachment frame 32 to lock the base frame 1 to the attachment frame 32 or to unlock the base frame 1 from the attachment frame 32.

Although particular embodiments of the invention have been described in detail for purposes of illustration, various modifications and enhancements may be made without departing from the spirit and scope of the invention.

What the invention claimed is:

1. An adjustable display screen support comprising:
   a support arm, said support arm having a bottom end, a top end opposite to said bottom end, and a connector provided at said top end;
   a mounting assembly provided at the bottom end of said support arm for securing said support arm to the top of a desk;
   a coupling block fastened to said connector of said support arm;
   a rail mounted on said coupling block; and
   a display screen mount mounted on said rail to support a display screen; wherein:
   said coupling block comprises a base frame, said base frame having an axle hole and a bottom hook hole, an attachment frame affixed to said rail and attachable to said base frame, said attachment frame having a bottom hook for hooking in said bottom hook hole of said base frame and a latch hole near said bottom hook, and a lock mounted in said axle hole of said base frame and operable to move a latch thereof in and out of said latch hole for locking/unlocking said base frame and said attachment frame; and
   said rail comprises a flat base panel, said flat base panel having at least one longitudinal sliding slot, a cover shell fixedly mounted with said display screen mount and fixedly covered on said flat base panel, a slide mounted inside said cover shell and affixed to said attachment frame of said coupling block and movable along said at least one longitudinal sliding slot relative to said display screen mount and the display screen being supported on said display screen mount, said slide having at least one sliding flange inserted through and movable along said at least one longitudinal sliding slot and affixed to said attachment frame of said coupling block and at least one accommodation chamber, and at least one spiral spring respectively mounted in said at least one accommodation chamber, said at least one spiral spring each one end affixed to said slide and an opposite end affixed to one end of said cover shell;
   wherein said lock comprises a bolt inserted through the axle hole of said base frame of said coupling block and fixedly connected with the latch of said lock, two spring-supported pins that are provided at said bolt at two opposite sides near said latch and movable between a first position where said spring-supported pins are received inside said axle hole and a second position where said spring-supported pins are stopped outside said axle hole, a knob coupled to one end of said bolt opposite to said latch for pressing by the user to move said spring-supported pins from said second position to said first position so that said bolt is rotatable with said knob to move said latch in and out of said latch hole, and a spring member is sleeved onto said bolt and stopped between an outside wall of said axle hole and said knob.

2. The adjustable display screen support as claimed in claim 1, wherein said support arm comprises a plurality of hollow arm sections that are pivotally connected to one another for allowing adjustment of the angle of one of said hollow arm sections relative to the other of said hollow arm sections and for the passing of an electric cable of the display screen supported on said display screen mount, and a plurality of cover shells respectively covered on said hollow arm sections to keep the electric cable of the display screen from sight.

3. The adjustable display screen support as claimed in claim 1, wherein said base frame of said coupling block comprises at least one coupling flange extending around the periphery thereof, and said attachment frame of said coupling block comprises at least one coupling groove coupled to the at least one coupling flange of said base frame.

4. The adjustable display screen support as claimed in claim 1, wherein said lock is a lock cylinder rotatable with a key to move said latch in and out of said latch hole.

5. The adjustable display screen support as claimed in claim 1, wherein said flat base panel comprises two transverse bumpers disposed at two distal ends thereof and adapted for limiting movement of said slide along said at least one longitudinal sliding slot between said transverse bumpers.

6. The adjustable display screen support as claimed in claim 1, wherein said cover shell of said rail has two end plates respectively affixed to two distal ends thereof to hold said flat base panel inside said cover shell.

7. The adjustable display screen support as claimed in claim 1, wherein said cover shell of said rail has a mounting through hole disposed near one end thereof and accommodates a screw that is mounted with a nut to secure one end of said at least one spiral spring.

8. The adjustable display screen support as claimed in claim 7, wherein said slide has a locating groove extended to a bottom end thereof for receiving said screw and said nut that affix one end of said at least one spiral spring to said cover shell.

9. An adjustable display screen support comprising:
a support arm, said support arm having a bottom end, a top end opposite to said bottom end, and a connector provided at said top end;
a mounting assembly provided at the bottom end of said support arm for securing said support arm to the top of a desk;
a coupling block fastened to said connector of said support arm;
a rail mounted on said coupling block; and
a display screen mount mounted on said rail to support a display screen; wherein:
said coupling block comprises a base frame, said base frame having an axle hole and a bottom hook hole, an attachment frame affixed to said rail and attachable to said base frame, said attachment frame having a bottom hook for hooking in said bottom hook hole of said base frame and a latch hole near said bottom hook, and a lock mounted in said axle hole of said base frame and operable to move a latch thereof in and out of said latch hole for locking/unlocking said base frame and said attachment frame; and
said rail comprises a flat base panel, said flat base panel having at least one longitudinal sliding slot, a cover shell fixedly mounted with said display screen mount and fixedly covered on said flat base panel, a slide mounted inside said cover shell and affixed to said attachment frame of said coupling block and movable along said at least one longitudinal sliding slot relative to said display screen mount and the display screen being supported on said display screen mount, said slide having at least one sliding flange inserted through and movable along said at least one longitudinal sliding slot and affixed to said attachment frame of said coupling block and at least one accommodation chamber, and at least one spiral spring respectively mounted in said at least one accommodation chamber, said at least one spiral spring each one end affixed to said slide and an opposite end affixed to one end of said cover shell;
wherein said latch of said lock is received inside said base frame of said coupling block and movable in and out of said latch hole by a bolt.

10. The adjustable display screen support as claimed in claim 9, wherein said support arm comprises a plurality of hollow arm sections that are pivotally connected to one another for allowing adjustment of the angle of one of said hollow arm sections relative to the other of said hollow arm sections and for the passing of an electric cable of the display screen supported on said display screen mount, and a plurality of cover shells respectively covered on said hollow arm sections to keep the electric cable of the display screen from sight.

11. The adjustable display screen support as claimed in claim 9, wherein said base frame of said coupling block comprises at least one coupling flange extending around the periphery thereof, and said attachment frame of said coupling block comprises at least one coupling groove coupled to the at least one coupling flange of said base frame.

12. The adjustable display screen support as claimed in claim 9, wherein said lock is a lock cylinder rotatable with a key to move said latch in and out of said latch hole.

13. The adjustable display screen support as claimed in claim 9, wherein said flat base panel comprises two transverse bumpers disposed at two distal ends thereof and adapted for limiting movement of said slide along said at least one longitudinal sliding slot between said transverse bumpers.

14. The adjustable display screen support as claimed in claim 9, wherein said cover shell of said rail has two end plates respectively affixed to two distal ends thereof to hold said flat base panel inside said cover shell.

15. The adjustable display screen support as claimed in claim 9, wherein said cover shell of said rail has a mounting through hole disposed near one end thereof and accommodates a screw that is mounted with a nut to secure one end of said at least one spiral spring.

16. The adjustable display screen support as claimed in claim 15, wherein said slide has a locating groove extended to a bottom end thereof for receiving said screw and said nut that affix one end of said at least one spiral spring to said cover shell.

17. The adjustable display screen support as claimed in claim 9, wherein the bolt is inserted through the axle hole of said base frame of said coupling block and fixedly connected with the latch of said lock, two spring-supported pins that are provided at said bolt at two opposite sides near said latch and movable between a first position where said spring-supported pins are received inside said axle hole and a second position where said spring-supported pins are stopped outside said axle hole, a knob coupled to one end of said bolt opposite to said latch for pressing by the user to move said spring-supported pins from said second position to said first position so that said bolt is rotatable with said knob to move said latch in and out of said latch hole, and a spring member is sleeved onto said bolt and stopped between an outside wall of said axle hole and said knob.

* * * * *